(12) United States Patent
Bloching et al.

(10) Patent No.: US 8,046,638 B2
(45) Date of Patent: Oct. 25, 2011

(54) TESTING OF DISTRIBUTED SYSTEMS

(75) Inventors: Uwe Bloching, Nussloch (DE); Stefan Rau, Dielheim (DE)

(73) Assignee: SAP AG, Walldorf (DE)

( * ) Notice: Subject to any disclaimer, the term of this patent is extended or adjusted under 35 U.S.C. 154(b) by 189 days.

(21) Appl. No.: 12/492,867

(22) Filed: Jun. 26, 2009

(65) Prior Publication Data

US 2010/0332904 A1 Dec. 30, 2010

(51) Int. Cl.
*G06F 11/00* (2006.01)

(52) U.S. Cl. .......................................................... 714/31

(58) Field of Classification Search ................ 714/8–10, 714/18, 25–27, 30–33, 37, 38, 45, 46
See application file for complete search history.

(56) References Cited

U.S. PATENT DOCUMENTS

| 6,163,805 | A * | 12/2000 | Silva et al. ..................... 709/227 |
| 6,662,217 | B1 * | 12/2003 | Godfrey et al. ................ 709/219 |
| 6,704,883 | B1 * | 3/2004 | Zhang et al. ...................... 714/4 |
| 6,810,364 | B2 * | 10/2004 | Conan et al. .................... 702/188 |
| 6,975,955 | B1 * | 12/2005 | Lukindo ........................ 702/119 |
| 7,165,189 | B1 * | 1/2007 | Lakkapragada et al. ......... 714/31 |
| 2003/0233216 | A1 * | 12/2003 | Ouchi ............................ 702/186 |
| 2005/0282133 | A1 * | 12/2005 | Crowhurst ..................... 434/323 |

* cited by examiner

*Primary Examiner* — Nadeem Iqbal
(74) *Attorney, Agent, or Firm* — Schwegman, Lundberg & Woessner, P.A.

(57) ABSTRACT

In an embodiment, a method is provided for tracking a test. In this method, a test session identifier is transmitted to a test system. The test session identifier identifies a particular test session. A test of a component is triggered at the test system, and this test provides test results, which are received from the test system. The test results include the test session identifier, which allows the tests to be associated with the particular test session.

20 Claims, 9 Drawing Sheets

TESTING OF DISTRIBUTED SYSTEMS

FIELD

The present disclosure relates generally to tests. In an embodiment, the disclosure relates to testing of distributed systems.

BACKGROUND

Many applications are based in a distributed environment where an assignment of tasks to multiple software components (and hardware components) enables, for example, creation of business applications through composition. An example of a composed business application includes business processes and composite applications based on enterprise compound services, process components, and user-interface applications using core services.

Tests may be executed on such a distributed environment to verify that each component works as expected concerning, for example, functional correctness and performance. To test a particular component, most existing test techniques involve the insertion of specialized test code into production code. However, such test techniques can be inefficient because, for example, every new component requires the creation of new test code. Furthermore, it can be extremely difficult to coordinate between all the different test codes within the distributed environment.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for tracking tests of software and hardware components. In general, a central system (or a master system) is provided to communicate with one or more remote test systems in a test environment. This central system is configured to, for example, manage, track, verify, and/or analyze tests executed at the test systems. In a particular embodiment, each test or group of tests may be tracked by the assignment of identifiers to each test or group of tests. As will be explained in more detail below, the central system generates these identifiers and forwards them to the remote test systems for use in tracking the tests.

Figure 1:
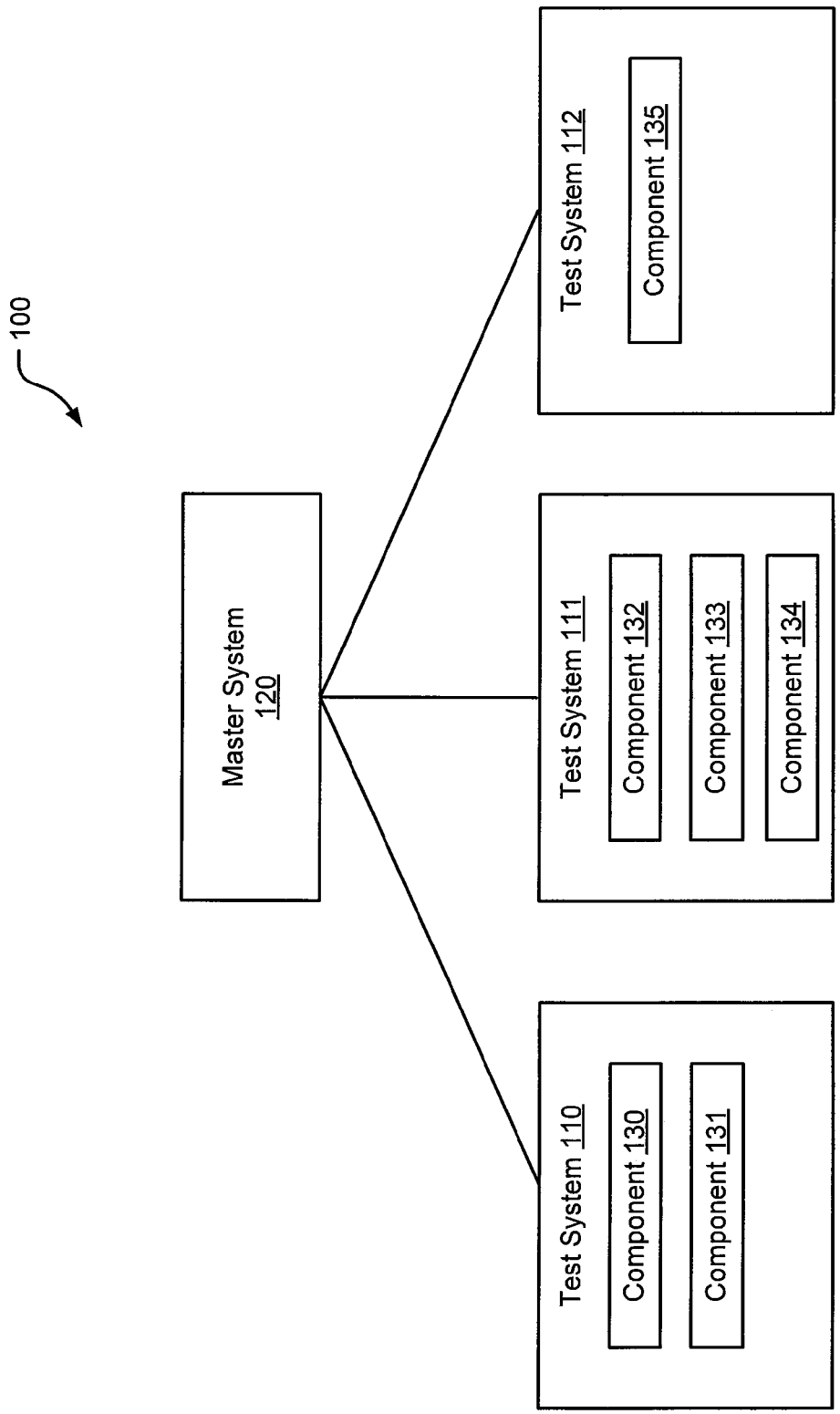
FIG. 1 depicts a block diagram of a distributed test environment, in accordance with an illustrative embodiment.

FIG. 1 depicts a block diagram of a distributed test environment 100, in accordance with an illustrative embodiment. The distributed test environment 100 includes multiple test systems 110-112 that are in communication with a master system 120. Generally, a "test system," such as test system 110, 111, or 112, is an assemblage of one or more components 130-135 for testing. Each test system 110, 111, or 112 (and the master system 120) may be hosted on one or more computing devices. For example, each test system 110, 111, or 112 may be hosted on a different computing device. Alternatively, the test systems 110 and 111 may be hosted on one computing device while the test system 112 may be hosted on a different computing device. In another example, all the test systems 110, 111, and 112 (and even the master system 120) may be hosted on a single computing device.

As used herein, a "component," such as component 130, 131, 132, 133, 134, or 135, refers to a part or element of one or more software application or hardware apparatus. A software component can, for example, be an element of a software system programmed to provide a predefined service or event. Examples of a software component include a function, a subroutine, an application, and an object. As an example, the components 130-135 can be a number of components in a distributed software system, such as a distributed enterprise application, or services (e.g., an enterprise resource planning software and enterprise performance management software). The components 130-135 in such a distributed enterprise application may, for example, track context and apply account relationships, data, and/or rule-based constraints in business applications. On the other hand, a hardware component can, for example, be a variety of elements of a hardware system that has the capability to process test session identifiers and test sequence identifiers, which are described in more detail below. Examples of such a hardware component include dedicated circuitry or logic that is permanently configured (e.g., a processor and a field-programmable gate array (FPGA)) or an application-specific integrated circuit (ASIC)) to perform certain operations. It should further be noted that combinations of software and hardware components may also be tested together. For example, components located at different layers (e.g., software layer, component layer, and chip layer) may be tested together. An example of such a test include an integration test of a graphics card, where the test includes calls to the graphics chip and also calls between the components on the graphics chip.

Still referring to FIG. 1, the master system 120 generally is a console that is in communication with all the test systems 110, 111, and 112. The master system 120 can manage, track, verify, and/or analyze tests executed at the test systems 110-112. For example, the master system 120 can control the execution of different tests at one or more of the test systems 110-112. Furthermore, the master system 120 can also track and verify every test being executed at the test systems 110-112. As explained in more detail below, the master system 120 may track the tests by, for example, assigning a unique identifier to a single test or a session of tests.

Figure 2:
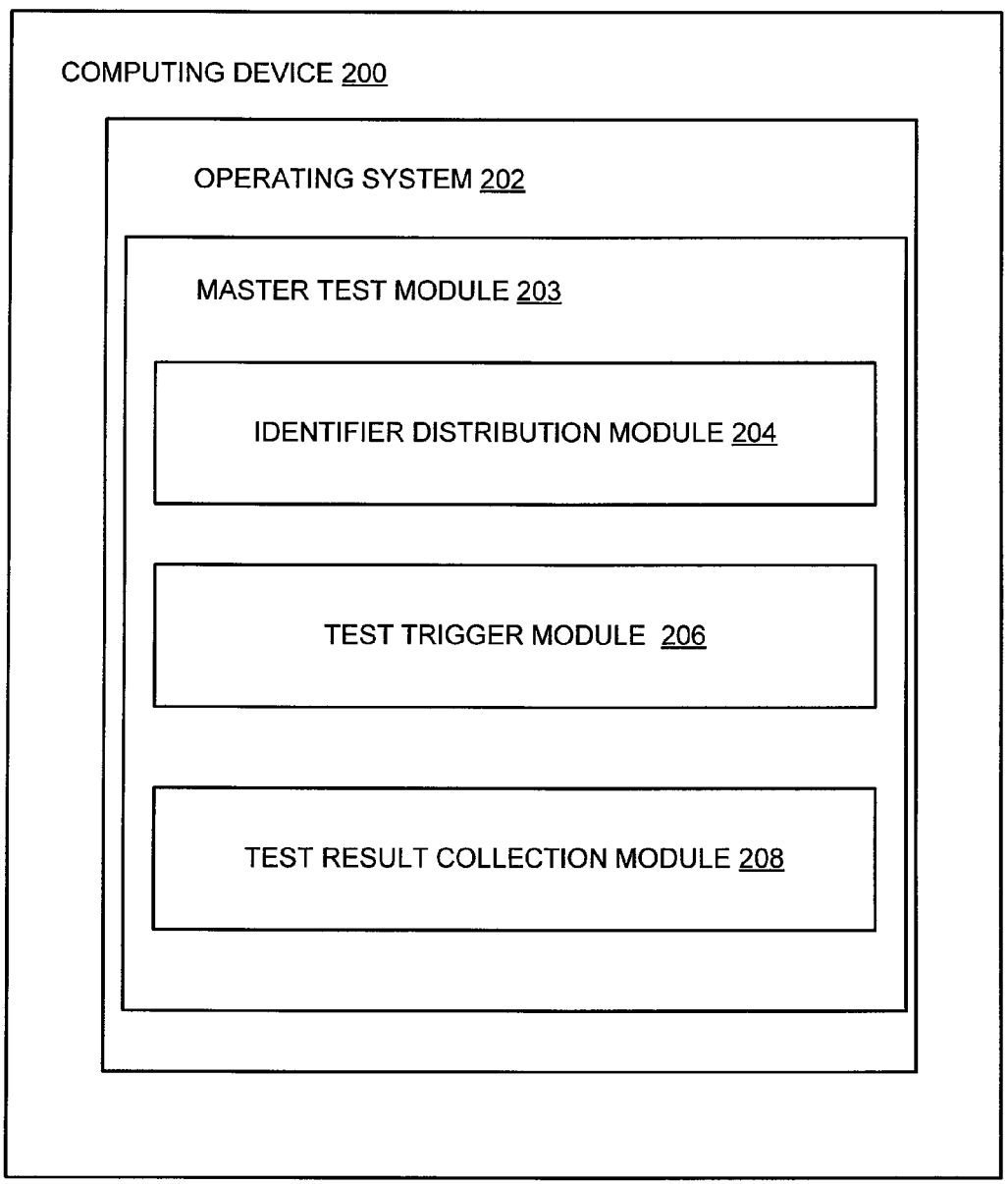
FIG. 2 depicts a block diagram of a master test module, in accordance with an embodiment, included in a computing device.

FIG. 2 depicts a block diagram of a master test module 203, in accordance with an embodiment, included in a computing device 200. It should be appreciated that the computing device 200 may be deployed in the form of, for example, a personal computer, a laptop computer, a server computer, a tablet personal computer, a personal digital assistant, or other computing devices. The computing device 200 may be included in a test environment. For example, the computing device 200 may form a part of the master system 120 depicted in FIG. 1. Referring to FIG. 2, in various embodiments, the computing device 200 may be used to implement computer programs, logic, applications, methods, processes, or software to manage, track, verify, and/or analyze tests at remote test systems, as described in more detail below.

In the example depicted in FIG. 2, the computing device 200 executes an operating system 202 that manages the other software processes and/or services executing on the computing device 200. These software processes and/or other services include a master test module 203, which may be composed of an identifier distribution module 204, a test trigger module 206, and a test result collection module 208. The identifier distribution module 204 is configured to distribute or transmit various identifiers used in the tracking of tests. For example, the identifier distribution module 204 is configured to distribute test session identifiers, which is explained in more detail below, to all the test systems that are in communication with the master test module 203. In contrast, the test trigger module 206 is configured to control the execution of tests. For example, as explained in more detail below, the test trigger module 206 can trigger specific tests at one or more test systems.

After the tests have been triggered, the test result collection module 208 collects or receives test results from one or more test systems. The test results may be stored in the master test module 203 or at another location. In addition to collecting test results, the test result collection module 208 may also include tools that are used to verify and analyze the test results, the tools of which are explained in more detail below. It should be appreciated that in other embodiments, the master test module 203 may include fewer, more, or different modules apart from those shown in FIG. 2. For example, in an alternate embodiment, the master test module 203 may additionally include an analysis module (not shown) that is configured to analyze and/or identify test results associated with a particular test session.

Figure 3:
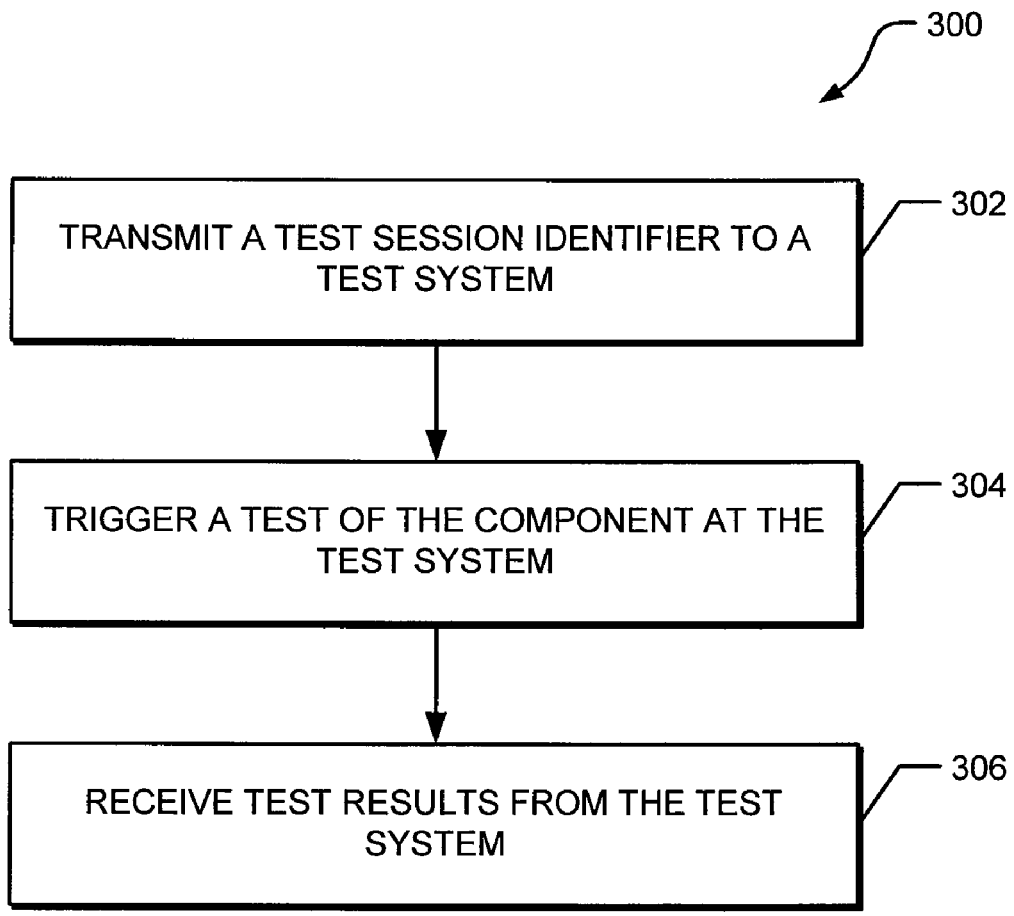
FIG. 3 depicts a flow diagram of a general overview of a method, consistent with an embodiment, for tracking tests executed at one or more test systems.

FIG. 3 depicts a flow diagram of a general overview of a method 300, consistent with an embodiment, for tracking tests executed at one or more test systems. The method 300 may be implemented by the master test module 203 and employed in the computing device 200 depicted in FIG. 2. As depicted in FIG. 3, the master system transmits a test session identifier to a test system at 302. As used herein, a "test session identifier" refers to a value (numeric and/or textual) that uniquely identifies a particular test session, which refers to a technical bracket for each run of a set or group of tests. As an example, a test session identifier can be a globally unique identifier, which is a special type of identifier that provides a unique reference number in any context. It should be noted that in other embodiments, the master system may also transmit more than one test session identifier to more than one test system, and such operations are described in more detail below.

With the test session identifier transmitted to the test system, the master system at 304 thereafter triggers one or more tests of components at the test system. The master system may trigger the tests by, for example, calling an execution of a specific test program or test script at the test system. In a particular example, the master system can call a particular test program by identifying a report name or name of a particular class.

Once the tests of the components are triggered at the test system, the tests may generate or create various test results. A "test result," as used herein, refers to any suitable output resulting from a test of one or more components. For example, a component itself may generate or provide test results. In another example, a testing program that tests the components may generate the test results. An example of a test result is a response time of a component to a particular input. In another example, a test result may include a data access time of a component. Such response time and data access time may be used, for example, in analyzing the performance of the components. Other examples of test results include data generated by the components, operations resulting from the components, signals generated by the components, and other test results.

Still referring to FIG. 3, the master system receives the test results from the test system at 306. The master system may transmit requests for a particular test result to the test system. Alternatively, the test system may be automatically configured to transmit the test results to the master system. In an embodiment, the test results include the test session identifier, which allows the test results to be associated with a particular test session. As a result, for example, test results associated with a particular test session may be identified. That is, the pairing of a test session identifier with associated test results allows, for example, a user or the master system itself to be able to differentiate test results associated with a particular test session from test results of other test sessions. Such a pairing thereby, for example, allows particular test results to be tracked, verified, and/or analyzed on a per test session basis, which may result in fast isolation of defects in one or more components at the test system.

Figure 4:
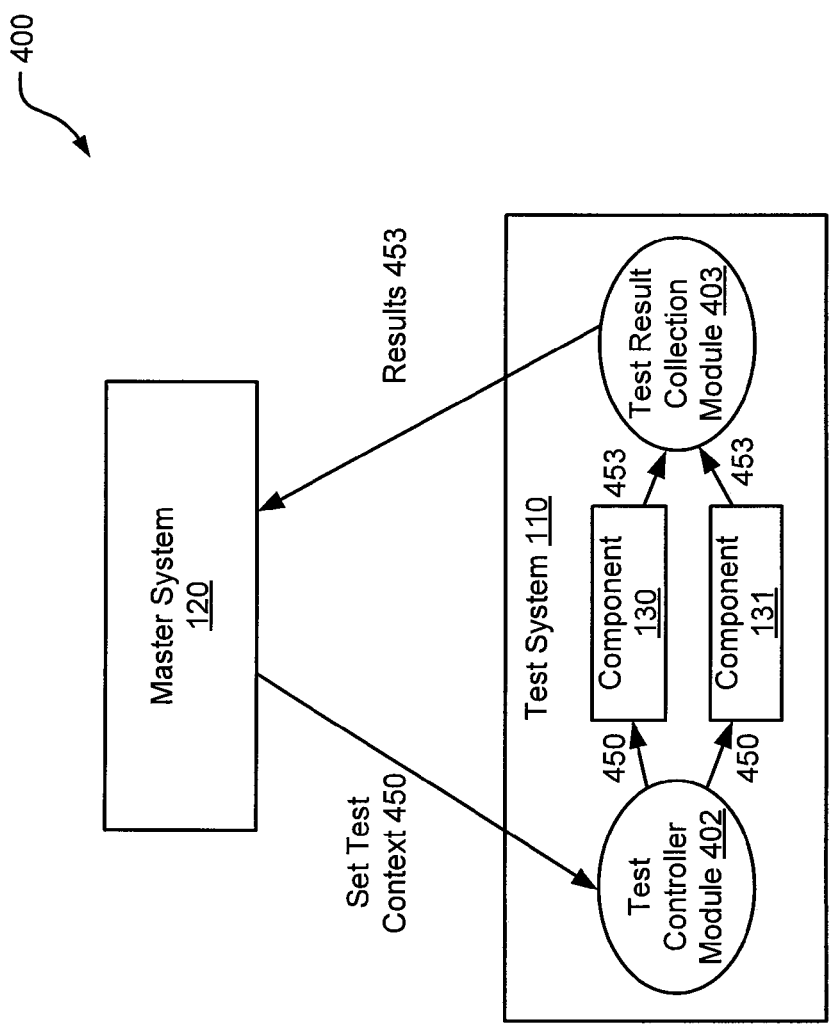
FIG. 4 depicts a block diagram of a test environment, in accordance with another embodiment, illustrating the tracking of tests executed at a test system.

FIG. 4 depicts a block diagram of a test environment 400, in accordance with one embodiment, illustrating the tracking of tests executed at a test system 110. The test environment 400 includes a master system 120 in communication with a single test system 110. In this embodiment, the test system 110 includes components 130-131, a test controller module 402, and a test result collection module 403. In software, it should be noted that within the test system 110, the components 130-131, in one example, are independent of the test controller module 402 and the test result collection module 403. As a result, the components 130-131 are not customized or particularly programmed to interface with the test controller module 402 and the test result collection module 403. Rather, the components 130-131 can be the same components 130-131 that are used in a production system, which may be configured to interface with other dependent components (not shown).

The test controller module 402 generally is configured for retrieving settings and test context 450 used in the execution of tests. As used herein, a "test context," such as test context 450, refers to information and/or data defining or specifying a behavior of one or more components 130-131 during an execution of a test. As an example, the test context 450 may include configurations and commands for use in testing a component 130 or 131. The test context 450, for example, allows the distribution of a single set of test context to different test systems, such as test system 110, thereby creating a single test scenario. Furthermore, in another example, the master system 120 can simultaneously change the test scenario at different test systems by transmitting the test context 450 to these test systems. It should be noted that different components 130-131 may recognize or interface with different languages. The statements defined or described in the test context 450 may be in a specific language usable with a particular component 130 or 131. However, in another embodiment, the statements may be in a generic format, which is independent of the languages used by the components 130-131. An example of such a format is Extensible Markup Language (XML), and the following Table A provides an example of the test context 450 formatted in XML. Other examples of generic formats may include document formats (e.g., text file format (or .txt format)), graphic file formats (e.g., JPEG), video file formats (e.g., MPEG-4), and other formats. The components 130-131 can be configured to recognize the generic format of the test context 450 or configured to translate the statements in generic format into a different language.

TABLE A

```
<?xml version="1.0" encoding="ISO-8859-1"?>
<TEST_CASE>
    <TEST_SESSION>4711</TEST_SESSION>
<TEST_NUMBER>17</TEST_NUMBER>
<BO_DATA_TO_RETURN>
    <SALESORDER>
    <ROOT>
    <ID>12345</ID>
    <ITEM>
        <ID>10</ID>
        <PRODUCT-ID>HT-1000</PRODUCT-ID>
        <QUANTITY-CONTEXT>1</QUANTITY-CONTEXT>
    </ITEM>
    <ITEM>
        <ID>20</ID>
        <PRODUCT-ID>HT-1001</PRODUCT-ID>
        <QUANTITY-CONTEXT>2</QUANTITY-CONTEXT>
    </ITEM>
    </ROOT>
    </SALESORDER>
</BO_DATA_TO_RETURN>
</TEST_CASE>
```

It should be appreciated that the test environment 400 can include a variety of different tests executed at the test system 110. For example, the test environment 400 may be configured to test accuracies of mailing addresses stored in a database. In this example, the master system 120 can simulate an error by loading a particular test context 450 that specifies to the components 130-131 to access the database where the addresses are stored, but not to search for the correct address when a request to retrieve a particular user's address is received. That is, the test context 450 can instruct the components 130-131 to provide incorrect addresses of users in response to requests for addresses. This test context 450 forces an error because the components 130-131 will access the database of addresses, but the addresses retrieved by the components 130-131 are incorrect or erroneous.

As depicted in FIG. 4, the master system 120 initially transmits the test context 450 to the test system 110. In this embodiment, the test session identifier may be included in the test context 450. However, in another embodiment, the test session identifier may be transmitted separately from the test context 450. The test controller module 402 receives the test context 450, which, in this example, includes the test session identifier. In effect, the test controller module 402 collects the test context 450 and stores the test context in, for example, a static class. Whenever the components 130-131 need information about the current test context 450, the components 130-131 may retrieve the test context 450 from the test controller module 402. Alternatively, the test controller module 402 may automatically transmit the test context 450 to the components 130-131 upon receipt of the test context 450 from the master system 120.

After the transmission of the test session identifier, the master system 120 then triggers tests of the components 130-131 at the test system 110. The execution of such tests based on the test context 450 results in the creation of test results 453 by, for example, the components 130-131. The test result collection module 403 is configured to receive or collect test results 453 created from the execution of the tests. The test result collection module 403 receives or collects test results 453 that are created by the components 130-131. In the example of FIG. 4, the components 130-131 generate the test results 453 and transmit them to the test result collection module 403. After the tests are completed, the test result collection module 403 transmits the collected test results 453 to the master system 120. Here, the test results 453 include the test session identifier, and the master system 120 or a user may use the test session identifier to track the tests by, for example, identifying the received test results 453 to be associated with a particular test session. It should be appreciated that the test system 110 may also be able to process or analyze the collected test results 453. As an example, the test result collection module 403 can compress the collected test results 453 for transmission to the master system 120.

Figure 5:
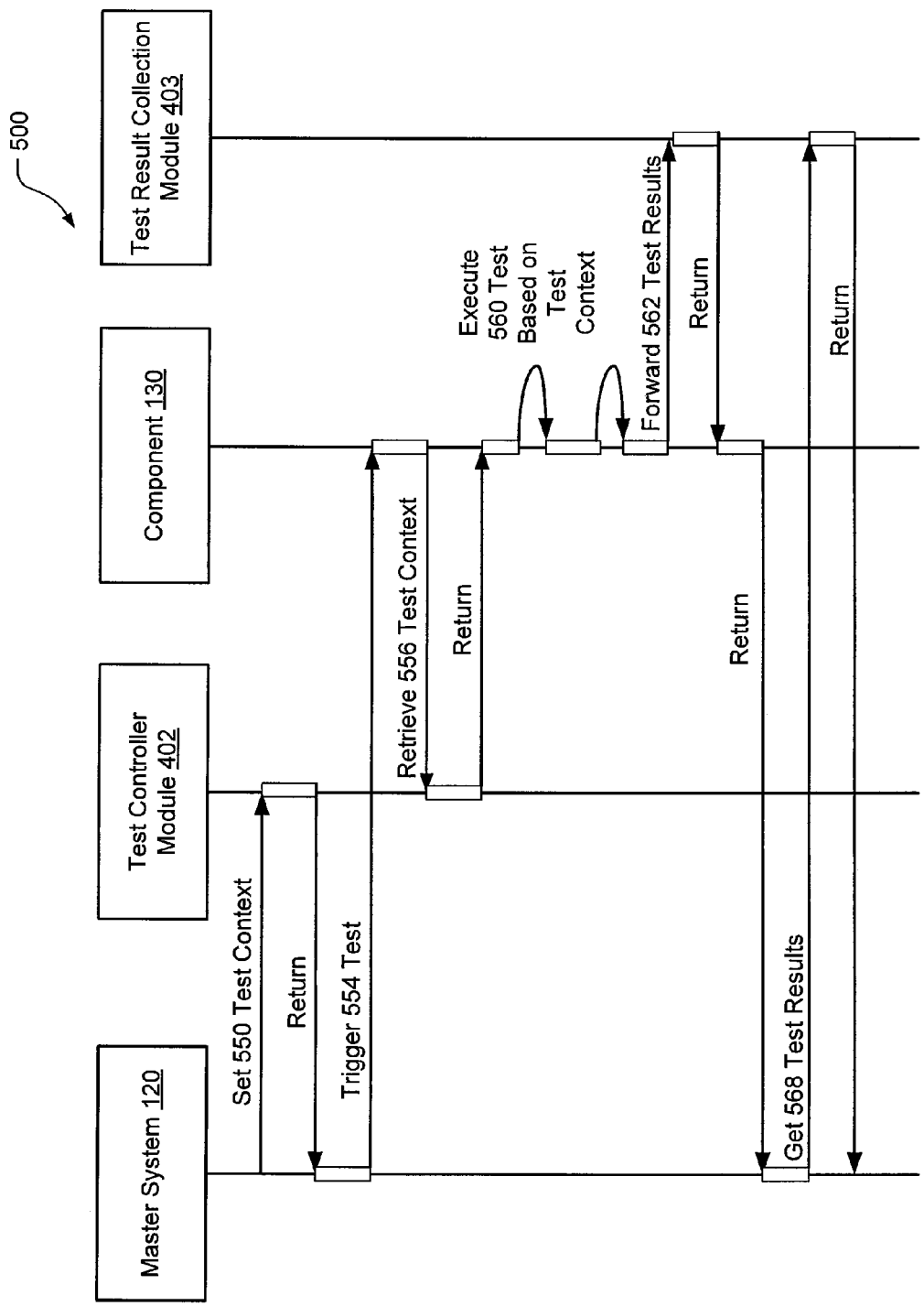
FIG. 5 depicts a timing diagram illustrating the tracking of tests at a test system, in accordance with an embodiment.

FIG. 5 depicts a timing diagram illustrating the tracking of tests at a test system, in accordance with an embodiment. In this example, the timing diagram 500 shows the interactions between a master system 120 and a test controller module 402, a component 130, and/or a test result collection module 403 at a test system. Initially, at 550, the master system 120 transmits to the test controller module 402 a test context that includes a test session identifier. After transmitting the test context and the test session identifier, the master system 120 triggers a test at 554 of at least one component 130 at the test system.

If information regarding the current test context is needed, the component 130 can request or retrieve the test context from the test controller module 402 at 556. With the test context, the test of the component 130 is then executed at 560 based on the test context, and during the test or after the test is completed, the component 130 transmits test results at 562 to the test result collection module 403.

As depicted in FIG. 5, in one embodiment, the master system 120 may transmit a request for the test results at 568 to the test result collection module 403. In another embodiment, the test result collection module 403 may automatically be configured to transmit the test results to the master system 120. In the embodiment where the master system 120 makes the request, the request may be for test results associated with a particular test session. Here, the request identifies the particular test session with its test session identifier. Upon receipt of the request with the test session identifier, the test result collection module 403 can identify or locate all the test results that are associated with the test session identifier because each test result is paired with a test session identifier. The test result collection module 403 then transmits to the master system 120 only the portion of all the collected test results that is associated with the particular test session (or test session identifier) as requested by the master system 120.

Figure 6:
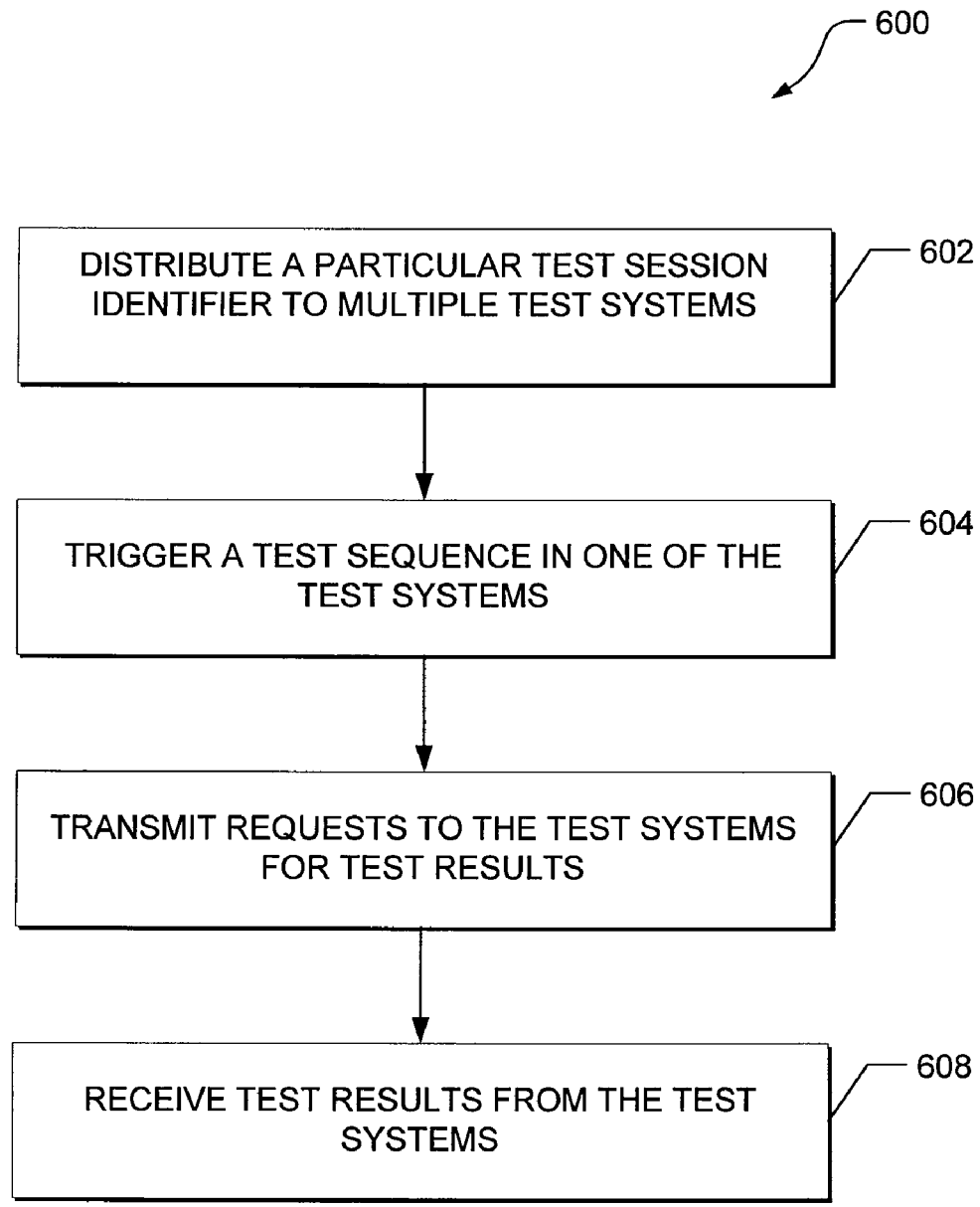
FIG. 6 depicts a flow diagram of a detailed method, in accordance with an alternate embodiment, for tracking tests executed at multiple, distributed test systems.

FIG. 6 depicts a flow diagram of a detailed method 600, in accordance with an alternate embodiment, for tracking tests executed at multiple, distributed test systems. The method 600 in this example may also be implemented by the master test module 203 and employed in the computing device 200 depicted in FIG. 2. As depicted in FIG. 6, a master system at 602 distributes (or transmits) a particular test session identifier to multiple test systems, each of which is hosted on different computing devices. The master system then triggers a test sequence in one of the test systems at 604. As used herein, a "test sequence" refers to one or more tests that are executed within a single test session. That is, a test sequence identifies a grouping of tests within a single test session. The tests can be associated with or assigned to a test sequence based on a variety of relationships. It should be appreciated that a test sequence (or a test itself) can trigger other test sequences on the same test system or on other test systems. For example, a test program testing one component may also request a service from another component that is also to be tested. The relationships between the triggered test sequences can be a hierarchical relationship or parent-child relationship where a test sequence that triggers another test sequence is a "parent" test sequence, and the triggered test sequence is a "child" test sequence.

After the master system triggers a test sequence at one of the test systems, the master system may then transmit requests to all the test systems for test results at 606. Depending on whether the parent test sequence triggers any child test sequence, the master system at 608 may receive test results from one or multiple test systems. For example, if the parent test sequence does not trigger any child test sequence, then the master system receives test results from only the one test system that executed the parent test sequence. However, if the parent test sequence does trigger other child test sequences at other test systems, then the master system may receive test results from these other test systems.

In the example described in FIG. 6, it should be noted that a test sequence identifier may also be assigned to each test sequence. As used herein, a "test sequence identifier," refers to a value (numeric and/or textual) that uniquely identifies a particular test sequence. The use of test sequence identifiers allow more granularity in tracking the tests by further enabling particular test sequences within a test session to be identified and tracked. In an embodiment, a master system may request particular test results associated with a particular test sequence from the test systems by identifying its test session identifier in a request to the test systems. Upon receipt of the request with the test session identifier, a test result collection module can identify or locate all the test results that are associated with the test sequence identifier because each test result may also be paired with a test sequence identifier. In addition to the test sequence identifier, the test systems may further include the test session identifier in the test results transmitted to the master system.

Figure 7:
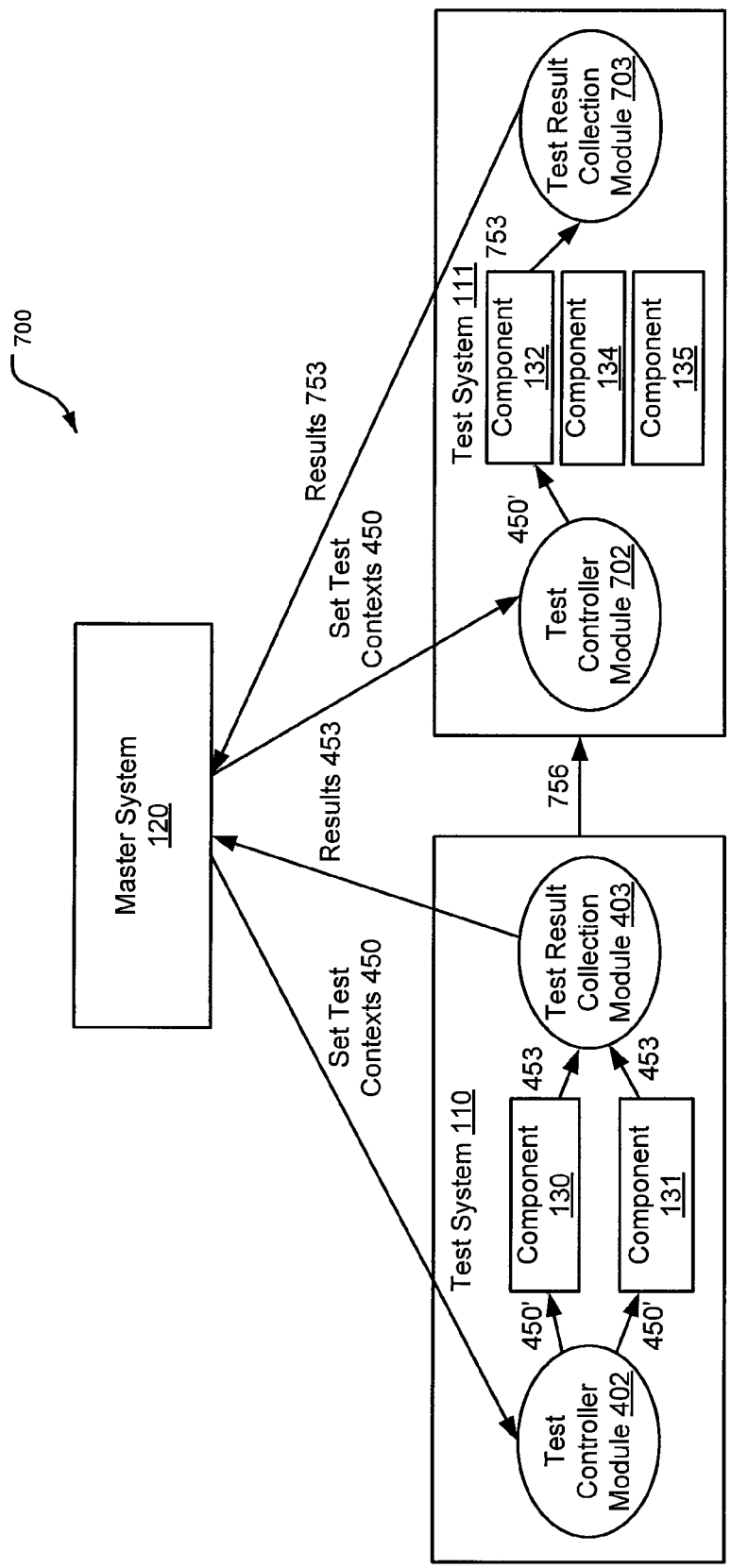
FIG. 7 depicts a block diagram of a distributed test environment, in accordance with another embodiment, illustrating a test sequence at one test system triggering a child test sequence at another test system.

FIG. 7 depicts a block diagram of a distributed test environment 700, in accordance with another embodiment, illustrating a test sequence at one test system 110 triggering a child test sequence at another test system 111. The test environment 700 includes a master system 120 in communication with two test systems 110 and 111. The test system 110 includes a test controller module 402, components 130-131, and a test result collection module 403. Similarly, the test system 111 includes a test controller module 702, components 132-135, and a test result collection module 703.

Again, it should be noted that the test environment 400 can include a variety of different tests executed at the test systems 110 and 111. For example, the test system 110 can be an order procurement system that is configured to process orders and the test system 111 can be a supplier system that receives and places the orders. The test environment 400 may be configured to test accuracies of an order of goods, such as laptop computers. In this example, an order of 10 laptop computers is placed by the order procurement system (or test system 110). In this example, the master system 120 can simulate an error by loading a particular test context 450 that specifies an order of 10 laptop computers is inputted into or received by the order procurement system. As a result, the order procurement system transmits an order of 10 laptop computers to the supplier system (or test system 111). To simulate an error, the test context 450 also specifies to the components 132-135 of the supplier system to provide an inaccurate confirmation of the order from the order procurement system. For example, the components 132-135 can be configured to transmit a confirmation of 8 laptop computers rather than the original order of 10 laptop computers.

In the example of FIG. 7, the master system 120 initially distributes test contexts 450 to both test systems 110 and 111. The test contexts 450 include multiple test contexts associated with different test sessions, with each test context paired with or assigned a test session identifier. The master system 120 then triggers a test sequence at test system 110, which executes tests of components 130-131 at the test system 110. This trigger may include a test session identifier that identifies a particular test session to be executed. If the components 130-131 need the test context 450' associated with this particular test session, the components 130-131 can retrieve from the test controller module 402 the test context 450' associated with this particular session.

During testing, the initial (or parent) test sequence triggers 756 a child test sequence of one component 132 at the test system 111. This component 132 at the test system 111 may retrieve the particular test context 450' from its test controller module 702 based on a test session identifier, which may be included in the triggering 756 by the parent test sequence at test system 110.

In this example, both test sequences at test systems 110 and 111 may be executed in parallel, and may end at different times. The test results 453 and 753 may not be available to the master system 120 until all the test sequences have been completed. Before the completion of the test sequences, the master system 120 may query each test system 110 or 111 for its state of testing. In one embodiment, each test system 110 or 111 may track a state of its testing, which allows the master system 120, for example, to monitor the activities of a test run. Examples of states include triggered, initialized, running, ended, cancelled, and other states. It should be noted that the "triggered" state identifies a tracking of dependent test sequences, and may, for example, be used to identify whether test sequences within a test session are still running.

The master system 120 may periodically transmit requests to the test systems 110 and 111 for their state of testing. In turn, the test system 110 may transmit a response to the master system 120 with the state of the test. This state allows the master system 120 to identify, for example, when tests associated with a particular test session and/or test sequence are completed at each test system 110 or 111. When the master system 120 has identified that all the tests are completed, the master system 120 may thereafter transmit requests to the test systems 110 and 111 for the test results. In response, the test result collection modules 403 and 703 transmit their test results 453 and 753, respectively, to the master system 120.

Figure 8:
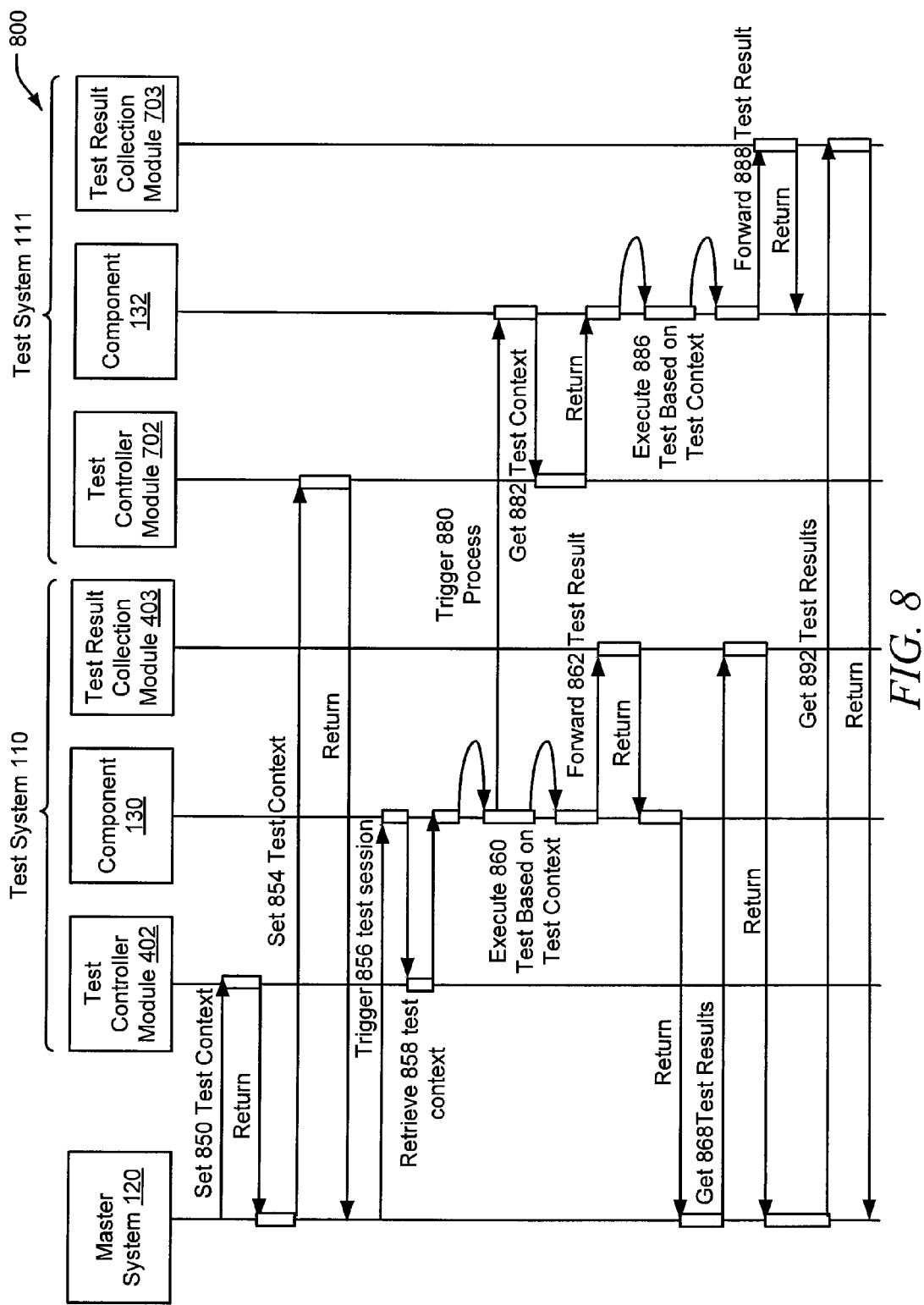
FIG. 8 depicts a timing diagram, consistent with an embodiment, illustrating the tracking of tests executed at multiple, distributed test systems.

FIG. 8 depicts a timing diagram 800, consistent with an embodiment, illustrating the tracking of tests executed at multiple, distributed test systems. In this example, the timing diagram 800 shows the interactions between a master system 120 and test systems 110 and 111. The test system 110 includes a test controller module 402, a component 130, and a test result collection module 403. Similarly, the test system 111 includes a test controller module 702, a component 132, and a test result collection module 703.

Initially, the master system 120, as depicted at 850 and 854, transmits a test context, which includes a test session identifier, to both test controller modules 402 and 702. After the test context is distributed, the master system 120 triggers a test at 856 of the component 130 at the test system 110. In response, the component 130 retrieves the test context at 858 from the test controller module 402, and a test is then executed at 860 based on the retrieved test context.

In this example, the initial or parent test sequence triggers at 880 a child test sequence of the component 132 at the test system 111. At the test system 111, the component 132 retrieves the test context at 882 from the test controller module 702, and another test sequence is executed at 886 based on the retrieved test context. After the completion of the test, the component 132 transmits at 888 the test results to the test result collection module 703.

During tests of the component 132 at the test system 111, the testing of the other component 130 at the other test system 110 has completed. The component 130 then transmits at 862 the test results to the test result collection module 403 and returns back to the master system 120. It should be noted that the test is started by, for example, calling a method of the component 130 synchronously, thereby returning back to the master system 120 after the method has come to an end. However, the component 132 is called asynchronously, for example, by the component 130, and therefore returns to nowhere and simply stops after the component 132 has done its work.

After the completion of all the tests at the test systems 110 and 111, the master system 120 may transmit requests, as depicted at 868 and 892, to both the test result collection modules 403 and 703 for the test results of, for example, a particular test session. Upon receipt of the request, the test result collection modules 403 and 703 retrieve the test results associated with the particular test session based on a test session identifier, and then transmit responses with the test results to the master system 120.

It should be noted that test session identifiers and/or test sequence identifiers may be used to identify particular test results that are associated with a particular test session and/or test sequence. A user, for example, may use this information to identify a particular test session or a test sequence within a test session that is working or has failed. Alternatively, the user may use this information to apply, for example, various analyses to test results of particular test sessions or test sequences. The identification of test results associated with particular test sessions and/or test sequences can be made by a user. However, it should be noted that in an embodiment, the master system 120 may also have some capability to isolate or identify particular test results. For example, still referring to FIG. 8, the master system 120 may request from the test result collection modules 403 and 703 all test results from different test sessions. In turn, the test result collection modules 403 and 703 transfer all their test results with their associated test session identifiers and test sequence identifiers. The master system 120 may store all the test results from test systems 110 and 111 in its non-volatile memory.

When a request is subsequently made to the master system 120 for particular test results associated with a particular test session, the master system 120 can compare the test session identifier associated with each test result with a particular test session identifier associated with the requested test session. The master system 120 can then identify the test results that are associated with the requested test session based on a match of their test session identifiers with the particular test session identifier associated with the requested test session.

Figure 9:
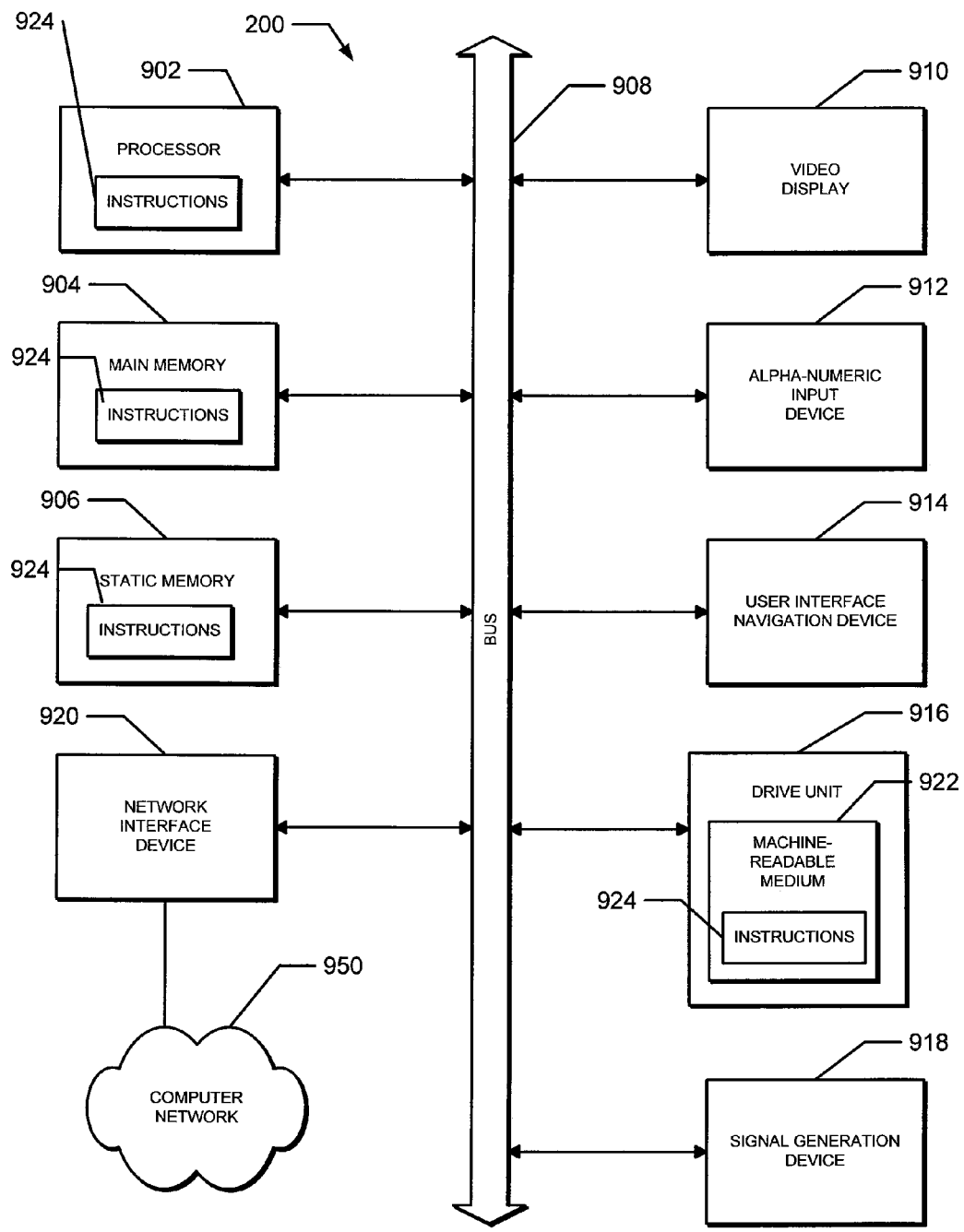
FIG. 9 depicts a block diagram of a machine in the example form of a computing device within which may be executed a set of instructions for causing the machine to perform any one or more of the methodologies discussed herein.

FIG. 9 depicts a block diagram of a machine in the example form of a computing device 200 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 200 includes a processor 902 (e.g., a central processing unit (CPU), a graphics processing unit (GPU) or both), a main memory 904 (e.g., random access memory (a type of volatile memory)), and static memory 906 (e.g., static random access memory (a type of volatile memory)), which communicate with each other via bus 908. The computing device 200 may further include video display unit 910 (e.g., a plasma display, a liquid crystal display (LCD) or a cathode ray tube (CRT)). The computing device 200 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by computing device 200, with the main memory 904 and processor 902 also constituting machine-readable, tangible media.

The data structures and instructions 924 may further be transmitted or received over a computer network 950 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 200) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 902 configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processor or processors 902 may be located in a single location (e.g., within a home environment, an office environment or as a server farm), while in other embodiments the processors 902 may be distributed across a number of locations.

While the embodiment(s) is (are) described with reference to various implementations and exploitations, it will be understood that these embodiments are illustrative and that the scope of the embodiment(s) is not limited to them. In general, techniques for tracking tests may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A computer-implemented method of testing at a plurality of test systems, the method comprising:
   distributing a particular test session identifier to the plurality of test systems, the plurality of test systems including a first test system and a second test system, the particular test session identifier identifying a particular test session;
   triggering a first test sequence in the first test system, the first test sequence configured to trigger a second test sequence in the second test system, the first test sequence further configured to provide a first test result at the first test system, the second test sequence configured to provide a second test result at the second test system;
   transmitting a plurality of requests to the plurality of test systems for a test result; and
   receiving the first test result and the second test result from the plurality of test systems in response to the plurality of requests, the first test result and the second test result including the particular test session identifier that allows the first test result and the second test result to be associated with the particular test session.

2. The computer-implemented method of claim 1, wherein the particular test session includes at least one test sequence, the at least one test sequence including a test of a component included in at least one of the plurality of test systems.

3. The computer-implemented method of claim 1, further comprising transmitting a test context to the plurality of test systems, the testing being based on the test context.

4. The computer-implemented method of claim 1, further comprising storing the first test result and the second test result in non-volatile memory.

5. The computer-implemented method of claim 1, further comprising:

transmitting the plurality of requests to the plurality test systems for a state of the testing at each of the plurality of test systems; and receiving the state of the testing from the each of the plurality of test systems, the state of the testing allowing identification of a completion of the testing.

6. A machine-readable medium that stores instructions, which, when performed by a machine, cause the machine to perform operations comprising:

distributing a particular test session identifier to a plurality of test systems, the plurality of test systems including a first test system and a second test system, the particular test session identifier identifying a particular test session;

triggering a first test sequence in the first test system, the first test sequence configured to trigger a second test sequence in the second test system, the first test sequence further configured to provide a first test result at the first test system, the second test sequence configured to provide a second test result at the second test system;

transmitting a request to the plurality of test systems for a plurality of test results;

receiving the plurality of test results from the plurality of test systems, the plurality of test results including the first test result and the second test result, the plurality of test results including a test session identifier;

comparing the test session identifier with the particular test session identifier; and identifying the first test result and the second test result being associated with the particular test session based on the test session identifier included in the first test result and the second test result matching the particular test session identifier.

7. The machine-readable medium of claim 6, wherein the plurality of test results further includes a plurality of test sequence identifiers, each test sequence identifier uniquely identifying a test sequence within a single test session.

8. The machine-readable medium of claim 6, wherein the first test system includes a software component, the first test sequence being a plurality of tests on the software component.

9. The machine-readable medium of claim 8, further comprising transmitting a test context to the first test system, the software component being tested based on the text context.

10. The machine-readable medium of claim 6, wherein the particular test session identifier is a globally unique identifier.

11. The machine-readable medium of claim 6, wherein the first test system is hosted on a computing device and the second test system is hosted on a different computing device.

12. A computing device comprising:
at least one processor; and
a memory in communication with the at least one processor, the memory being configured to store an identifier distribution module, a test trigger module, and a test collection module that are executable by the at least one processor, the identifier distribution module having instructions that when executed by the at least one processor, cause operations to be performed, the operations comprising transmitting a test session identifier to a test system, the test session identifier identifying a particular test session, the test trigger module having instructions that when executed by the at least one processor, cause operations to be performed, the operations comprising triggering a test of a component at the test system, the test of the component providing a plurality of test results, and the test result collection module having instructions that when executed by the at least one processor, cause operations to be performed, the operations comprising receiving the plurality of test results from the test system, the plurality of test results including the test session identifier that allows the plurality of test results to be associated with the particular test session.

13. The computing device of claim 12, wherein the test system includes a test result collector module that is configured to receive the plurality of test results from the component at the test system and transmit the plurality of test results to the test collection module.

14. The computing device of claim 12, wherein the identifier distribution module has instructions that when executed by the at least one processor, cause operations to be performed, further comprising transmitting a test context to the test system, the component being tested based on the test context.

15. The computing device of claim 14, wherein the test system includes a test controller module that is configured to receive the test context and to distribute the test context to the component at the test system.

16. The computing device of claim 14, wherein the test context is formatted in Extensible Markup Language (XML).

17. The computing device of claim 12, wherein the test is associated with a particular test sequence in a plurality of associated test sequences, the test session identifier further identifying a grouping of the plurality of associated test sequences.

18. The computing device of claim 12, wherein the test system is hosted on a different computing device that is in communication with the computing device.

19. The computing device of claim 12, wherein the test result collection module has instructions that when executed by the at least one processor, cause operations to be performed, further comprising:

transmitting a request to the test system for a state of the test; and receiving the state of the test from the test system, the state of the test allowing identification of a completion of the test.

20. The computing device of claim 12, wherein the component is one of a plurality of components in a distributed system.

* * * * *